US005638865A

United States Patent [19]
Wu

[11] Patent Number: 5,638,865
[45] Date of Patent: Jun. 17, 1997

[54] HAND PUMP ATTACHMENT MEMBER FOR ENGAGING WITH DIFFERENT TIRE VALVES

[76] Inventor: Scott Wu, No. 2, Lane 296, Ming Sheng Road, Wuffng Hsiang, Taichung, Taiwan

[21] Appl. No.: 492,405

[22] Filed: Jun. 19, 1995

[51] Int. Cl.$^6$ ............................................. F16K 11/087
[52] U.S. Cl. .................. 137/625.47; 137/223; 137/876; 251/352
[58] Field of Search .................. 137/223, 625.47, 137/876; 251/341, 352

[56] References Cited

U.S. PATENT DOCUMENTS

| | | | |
|---|---|---|---|
| 2,880,747 | 5/1959 | Newcomb | 137/223 |
| 4,019,536 | 4/1977 | Dong et al. | 251/352 |
| 4,524,679 | 6/1985 | Lyons | 251/352 |

*Primary Examiner*—John Fox
*Attorney, Agent, or Firm*—Charles E. Baxley, Esq.

[57] ABSTRACT

An attachment member for engaging with different tire valves includes a tube having a pipe laterally secured on top. Two caps are secured to the ends of the pipe. Two couplers and two gaskets are engaged in the pipe for engaging with different tire valves. The gaskets each has a curved surface for engaging with a ball. The ball is rotatably engaged between the gaskets and secured to a block for coupling to a hand pump and includes an orifice for aligning with either of the apertures of the gaskets and for supplying pressurized air to the either of the tire valves.

4 Claims, 2 Drawing Sheets

HAND PUMP ATTACHMENT MEMBER FOR ENGAGING WITH DIFFERENT TIRE VALVES

BACKGROUND OF THE INVENTION

1. Field of the Invention

The present invention relates to a hand pump attachment member, and more particularly to a hand pump attachment member for pumping different tire valves.

2. Description of the Prior Art

Typical hand pump attachment members for tire valves comprise a cylinder having a handle for pumping a piston which is slidably engaged in the cylinder. However, the hand pump attachment member includes an attachment member which is good for engaging with a specific type of tire valve and which is not suitable for engaging with different tire valves.

The present invention has arisen to mitigate and/or obviate the afore-described disadvantages of the conventional hand pump attachment members.

SUMMARY OF THE INVENTION

The primary objective of the present invention is to provide a hand pump attachment member which may be used for engaging with different tire valves.

In accordance with one aspect of the invention, there is provided a hand pump attachment member for engaging with different tire valves comprising a tube including an upper portion having a pipe laterally secured thereon so as to form a T-shaped configuration, the pipe including two end portions, two caps secured to the end portions of the pipe, the caps each including an opening formed therein for engaging with the tire valves, two couplers and two gaskets engaged in the end portions of the pipe, the gaskets each including a curved surface and each including an aperture formed therein, the couplers being provided for engaging with the tire valves, a hose including an upper end, a block secured in the upper end of the hose and including an upper portion having a ball secured thereon, the ball being engaged between the gaskets, a passageway formed in the block and the ball, an orifice formed in the ball and intersected with the passageway for engaging with and for aligning with the apertures of the gaskets, and means for rotatably securing the ball in the pipe and for rotatably supporting the ball between the gaskets. The ball is rotated by the hose in order to align the orifice with either of the apertures of the gaskets.

The ball includes an upper portion having a screw hole formed therein, the securing means includes a screw member engaged through the pipe and engaged with the screw hole of the ball so as to rotatably securing the ball in the pipe.

A first of the gaskets includes a circular projection for engaging with a first of the couplers, and a second of the gaskets includes an extension for engaging with a second of the couplers so as to engage with different tire valves.

Two sealing rings are engaged between the ball and the gaskets for forming an air tight seal between the ball and the gaskets.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
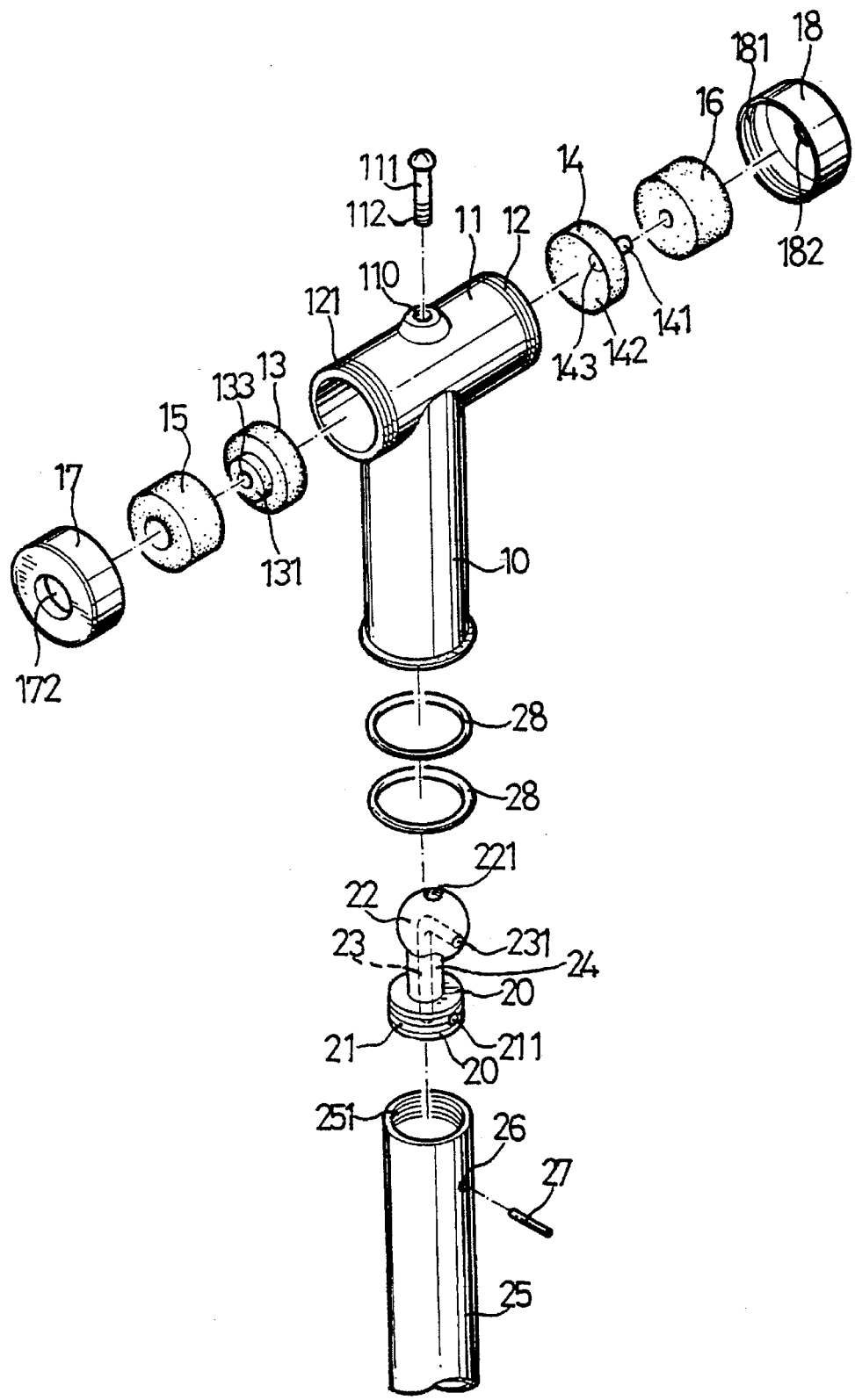
FIG. 1 is an exploded view of a hand pump attachment member in accordance with the present invention.

Referring to the drawings, a hand pump attachment member in accordance with the present invention comprises a tube 10 including a pipe 11 laterally secured on top thereof so as to form a T-shaped configuration. The pipe 11 includes two ends each having an outer thread 12, 121 formed thereon for engaging with inner threads 171, 181 of two caps 17, 18 respectively. The caps 17, 18 each includes an opening 172, 182 formed therein for engaging with tire valves. The pipe 11 includes a hole 110 formed in the upper portion for engaging with a screw 111 which includes an outer thread 112 formed in the lower portion. Two couplers 15, 16 and two gaskets 13, 14 are engaged in the end portions of the pipe 11. The gasket 13 includes a circular projection 131 for engaging with the coupler 15, and the other gasket 14 includes an extension 141 for engaging with the coupler 16. The gaskets 13, 14 each includes a curved surface 132, 142 and each includes an aperture 133, 143 formed therein. The tire valves may be engaged in the couplers 15, 16 via the openings 172, 182 of the caps 17, 18.

A block 20 includes an outer thread 21 for engaging with an inner thread 251 of a hose 25 which is coupled to the hand pump (not shown) and includes a hole 211 for engaging with a pin element 27 which is also engaged through the hole 26 of the hose 25 such that the block 20 may be solidly secured to the hose 25. The block 20 includes a post 24 extended upward therefrom and includes a ball 22 secured on top of the post 24. The ball 22 is engaged between the gaskets 13, 14 and includes a screw hole 221 formed in the upper portion for engaging with the screw 111 such that the ball 22 can be rotatably secured in the pipe 11. A passageway 23 is formed through the block 20, the post 24 and the ball 22 and includes an orifice 231 intersected with the passageway 23 for engaging with and for aligning with the apertures 133, 143 of the gaskets 13, 14, such that the pressurized air from the hose 25 may flow through the block 20 and the ball 22 and may flow into either of the couplers 15, 16 when the orifice 231 is aligned with the respective apertures 133, 143 of the gaskets 13, 14. It is preferable that two sealing rings 28 are engaged on the upper and lower portions of the ball 22 for making an air tight seal between the ball 22 and the gaskets 13, 14.

Figure 2:
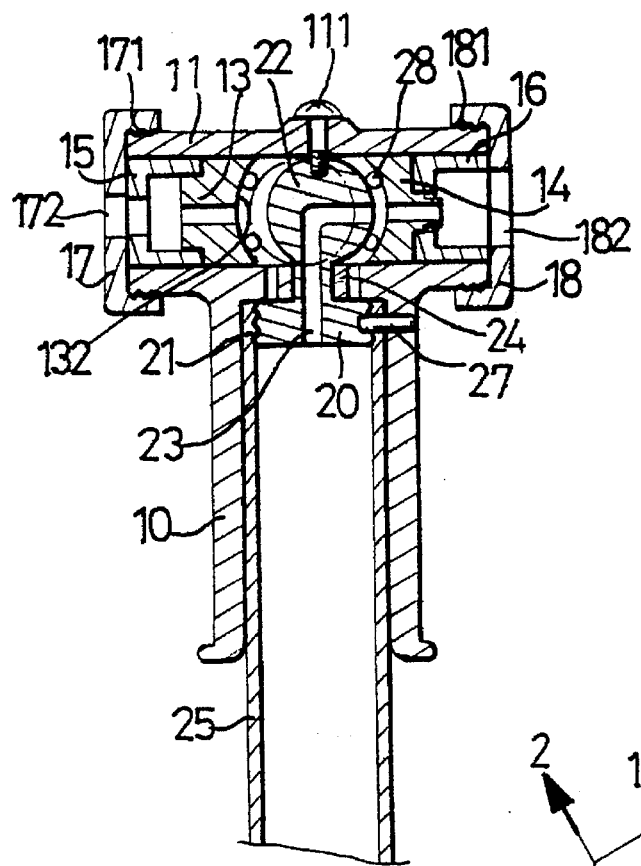
FIG. 2 is a cross sectional view taken along lines 2—2 of FIG. 3.
Figure 3:
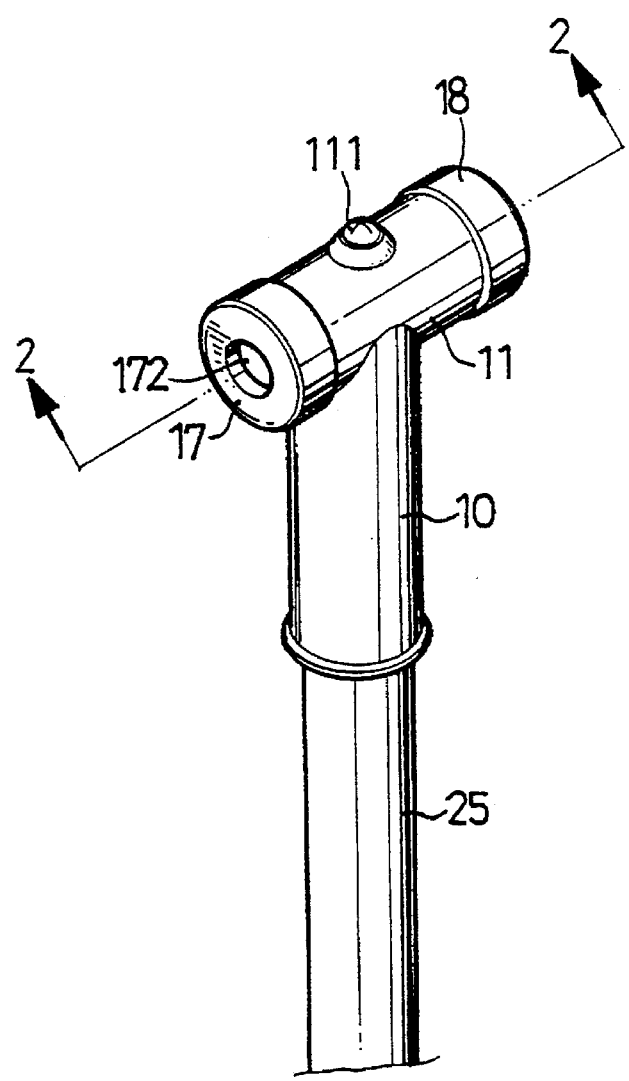
FIG. 3 is a perspective view of the hand pump attachment member.

It is preferable that the ball 22 is arranged eccentrically relative to the post 24, best shown in FIG. 2, and arranged such that the ball 22 may force against the gasket 13, 14 when the side portion having orifice 231 provided therein faces toward the gasket 13, 14. For example, as shown in FIG. 2, the gasket 14 is forced toward the cap 18 by the ball 22. The air may be pumped into the tire valve engaged in the coupler 16 via the passageway 23 of the block 20 and the orifice 231 of the ball 22. The coupler 15 is good for engaging with the tire valves of the American tires, and the coupler 16 is good for engaging with that of the Japanese tires, for example. The ball 22 may be rotated relative to the pipe 11 by the hose 25.

Accordingly, the hand pump attachment member in accordance with the present invention includes two couplers for engaging with different tire valves.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A hand pump attachment member for engaging with different tire valves comprising:

a tube including an upper portion having a pipe laterally secured thereon so as to form a T-shaped configuration, said pipe including two end portions, two caps secured to said end portions of said pipe, said caps each including an opening formed therein for engaging with the tire valves, two couplers and two gaskets engaged in said end portions of said pipe, said gaskets each including a curved surface and each including an aperture formed therein, said couplers being provided for engaging with the tire valves, a hose including an upper end, a block secured in said upper end of said hose and including an upper portion having a ball secured thereon, said ball being engaged between said gaskets, a passageway formed in said block and said ball, an orifice formed in said ball and intersected with said passageway for engaging with and for aligning with said apertures of said gaskets, and means for rotatably securing said ball in said pipe and for rotatably supporting said ball between said gaskets, said ball being rotated by said hose in order to align said orifice with either of said apertures of said gaskets.

2. A hand pump attachment member according to claim 1, wherein said ball includes an upper portion having a screw hole formed therein, said securing means includes a screw member engaged through said pipe and engaged with said screw hole of said ball so as to rotatably securing said ball in said pipe.

3. A hand pump attachment member according to claim 1, wherein a first of said gaskets includes a circular projection for engaging with a first of said couplers, and a second of said gaskets includes an extension for engaging with a second of said couplers.

4. A hand pump attachment member according to claim 1 further comprising two sealing rings engaged between said ball and said gaskets for forming an air tight seal between said ball and said gaskets.

* * * * *